United States Patent [19]
Luce

[11] Patent Number: 5,670,834
[45] Date of Patent: Sep. 23, 1997

[54] ELECTRIC POWER CONVERTER WITH LOAD COMPENSATION

[76] Inventor: John W. Luce, 1030 S. Sterling Ave., Tampa, Fla. 33629

[21] Appl. No.: 373,595

[22] Filed: Jan. 17, 1995

[51] Int. Cl.⁶ .................................................. H02K 7/06
[52] U.S. Cl. ................................ 310/20; 310/12; 310/14; 310/16
[58] Field of Search ........................... 310/12, 20, 16, 310/14; 318/114, 115

[56] References Cited

U.S. PATENT DOCUMENTS

| | | | |
|---|---|---|---|
| 3,805,099 | 4/1974 | Kelly | 310/12 |
| 4,020,374 | 4/1977 | Mailfert et al. | 310/80 |
| 4,394,592 | 7/1983 | Pataki | 310/12 |
| 4,870,558 | 9/1989 | Luce | 363/87 |
| 4,912,343 | 3/1990 | Stuart | 310/14 |
| 4,937,485 | 6/1990 | Mihalko | 310/208 |
| 4,965,864 | 10/1990 | Roth et al. | 318/135 |
| 5,055,725 | 10/1991 | LaSota | 310/14 |

*Primary Examiner*—Steven L. Stephan
*Assistant Examiner*—Elvin G. Enad
*Attorney, Agent, or Firm*—Charles A. McClure

[57] ABSTRACT

Electric power converter with load compensation, especially for electrical loads subject to fluctuations in demand for power, such as arc furnaces, welders, etc. An external source of electrical power is applied to a stationary input winding of the converter to produce a movable polyphase magnetic field coupled to an output winding movable at least in part over a limited range relative to the input winding. The movement is resisted by an interposed resilient member adapted to position the output winding to match the output to the input power demand of the load equipment thereby counteracting whatever fluctuations tend to occur in load resistance and current.

21 Claims, 3 Drawing Sheets

ELECTRIC POWER CONVERTER WITH LOAD COMPENSATION

TECHNICAL FIELD

This invention relates to improvement in powering of electrical equipment, such as arc furnaces, welders, or the like, to compensate for their fluctuating load characteristics, as by a Moving Magnetic Field Electric Power Converter of my U.S. Pat. No. 4,870,558.

BACKGROUND OF THE INVENTION

My identified patent discloses electric power conversion, as from AC to DC (or to AC), or from DC to AC (or to DC), by a moving magnetic field of nearly constant magnitude or flux density. In a cylindrical embodiment having an axial member or rotor and a coaxial member or stator, the field rotates about the axis, even with the so-called "rotor" stationary. In analogous equipment, having flat rotor and stator members with an intervening planar boundary, the magnetic field travels along the plane. Regardless of their configuration, the respective members are ferromagnetic and carry magnetically coupled input (primary) and output (secondary) windings—but not necessarily any moving parts, as only the magnetic field need move. Though both rotor and stator usually are immobilized, either may be enabled to move to a limited extent, such as for phase shifting. In that event the rotor of the cylindrical embodiment may be enabled to turn through a partial circle about the axis, and its analogous member in the flat configuration to move to and fro along the plane.

Utilization of electric power by an electrical load is usually evident as a flow of current through some load, and such current flow may vary over time dependent upon load characteristics. For example, an electric motor driving some machine may have to work harder when the machine's mechanical load increases, whereupon the current through the motor must increase. However, any current flow meets resistance on the way, starting with the internal impedance of the source and including the impedance of intervening transmission lines, lowering the voltage available at the motor, thus tending to reduce the current more when it is most needed—for larger loads.

In the shunt-wound DC generator, such drop-off or "droop" in the voltage available at an electrical load vs. the load current can be offset by what is known as "compounding" adding an extra field winding and connecting it in series with the load so that increased flow of load current bootstraps the generator output potential.

A generator so modified to compensate for load effect is called "flat-compounded" if it produces substantially unvarying potential at the load despite changes in load current, "over-compounded" if it actually raises its output potential at increased load current. There is little if any demand for comparable "under-compounding".

However, some electrical loads actually are characterized by a negative voltage coefficient of resistance, providing a substantial downslope to the curve of applied voltage vs. current through them. Electric arcs, for example, exhibit drastic drooping because arcs have much lower electrical resistance when conducting than when non-conducting. In such an instance, a field winding can be added to the generator and be reverse-connected to the output, to subtract therefrom (instead of adding thereto). See, for example, such a venerable authority as Dawes DIRECT CURRENTS, McGraw-Hill; Section 290, "Electric-welding Generators" (pp. 471–475 in 3rd ed., 1937), especially FIG. 353 and related text, including mid-page 473. Such reverse-connected winding provides "differential compounding".

Compensation means and methods for electrical arcs are found in such U.S. Pat. Nos. as Michaelis 3,526,808; Sonju 3,562,581; Bakardjiev & Doychinov 4,119,829; and Ao & Mori 5,155,740. Also of interest are Yamaguchi et al. 5,038,052; and Johnson & Rummel 5,038,052. The present invention treats the problem differently.

SUMMARY OF THE INVENTION

A primary object of the present invention is to provide means and methods for adjusting the power provided to any given electrical load to compensate for changes in the load's resulting current flow.

Another object of this invention is to counteract fluctuations in the power requirements of loads such as electric arc furnaces, welders, etc.

A further object of the invention is to accomplish foregoing objects for DC loads while converting supplied power from AC to DC.

Yet another object of this invention is to offset variable load demand via limited movement of an AC/DC converter movable member.

A still further object of the invention is to accomplish the foregoing objects in rotary and other converters by interposition of resilient means between fixed and movable converter members.

In general, these objects are attained by providing a polyphase moving magnetic field having substantially constant flux density and velocity when input power is supplied to a polyphase winding, and magnetically coupling such moving magnetic field to an output winding adapted to move through a limited range relative to the input winding, and also positioning such output winding via adjustable resilient means.

More particularly, these objects are attained in an electric power converter in cylindrical form, having a magnetically permeable stator, and a magnetically permeable coaxial rotor adapted to rotate relative to the stator through an angle limited to at most about a half circle of arc; resilient means between stator and rotor, and adapted to resist rotor rotation relative to the stator, a polyphase winding on the stator, adapted to produce a polyphase rotating magnetic field when energized, and a polyphase electrical power output winding magnetically coupled to the power input winding on the rotor and subdivided by being wound in part on the stator and in part on the rotor. The multiple output phases are rectified and are connected together to power DC loads. Another preferred embodiment is a similar power converter of flat, instead of cylindrical, form.

Other objects of the present invention, together with means and methods for attaining the various objects, will become apparent from the following description and the accompanying diagrams of preferred embodiments presented here by way of example rather than limitation.

DESCRIPTION OF THE INVENTION

Figure 1:
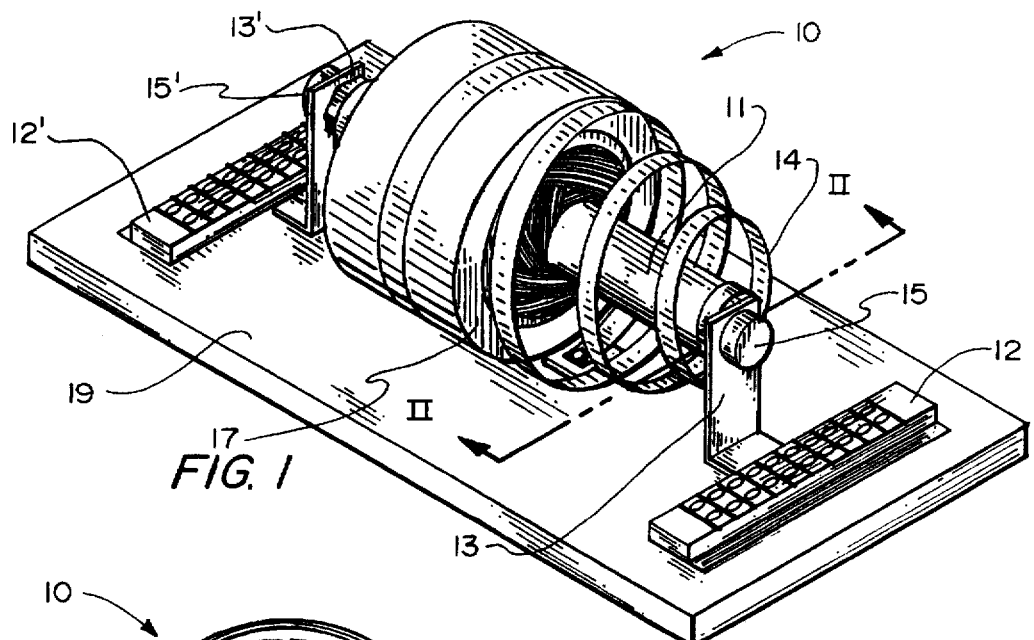
FIG. 1 is a perspective view of a cylindrical embodiment of the present invention.

FIG. 1 shows, in perspective, cylindrical embodiment 10 of this invention, featuring rotor 11—supported in end bearings 15, 15' on end mounts 13, 13' upstanding from base 19—and coaxial annular stator 17 around the rotor and affixed to the base. The rotor shaft protrudes beyond the stator at one end, and helical torsion spring 14 thereabout has its inner end affixed thereto and has its outer end affixed to the base at variable pre-tensioning length settings by fastener 18—visible in the next view. Shown schematically are input and output terminal strips 12', 12 (the latter with rectifying diodes—not shown). Electrical windings and connections are shown only fragmentarily here for simplicity, but it will be understood from my mentioned patent that there are plural odd (e.g., 3) input windings and preferably more (up to a dozen or so) output windings.

Figure 2:
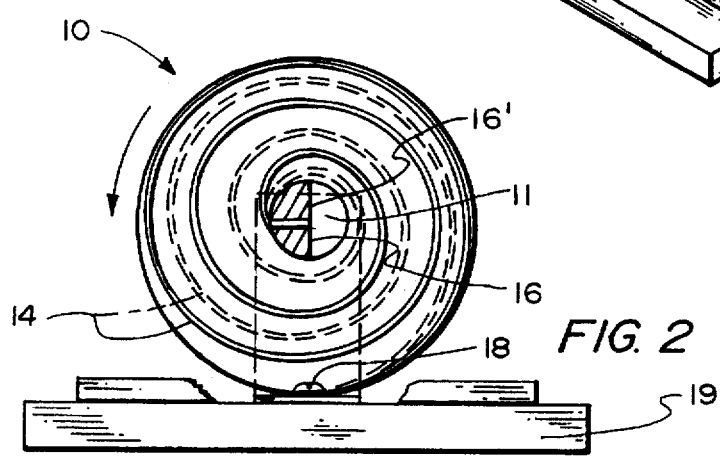
FIG. 2 is an end elevation of the cylindrical embodiment of the preceding view, featuring torsion spring resilient means.

FIG. 2 shows, in end elevation, cylindrical embodiment 10 of the preceding view, featuring helical torsion spring 14 shown both uncompressed (solid lines) and also compressed (broken lines) around the protruding end of rotor 11. Quadrant-shaped stop 16 on the end of rotor 11 coacts with quadrant-shaped stop 16' on the end mount to limit rotor rotation to at most about a half circle of arc (arrow). It is apparent that, as the rotor turns in a direction to juxtapose the coacting stops, the spring tightens around the rotor and increasingly opposes its rotation through the permitted limited arc. Other spring configurations could be substituted for the one illustrated.

The coaxial winding embodiments of the cylindrical embodiment of this invention may be "unrolled" stripwise into an alternative flat arrangement accompanied by similar flattening of the stator and rotor, as shown next. Whereas (for two-pole embodiments) electrical degrees equal mechanical degrees of rotation (a pole pitch is 180°), in a linear embodiment a pole pitch is the pole-to-pole distance.

Figure 3:
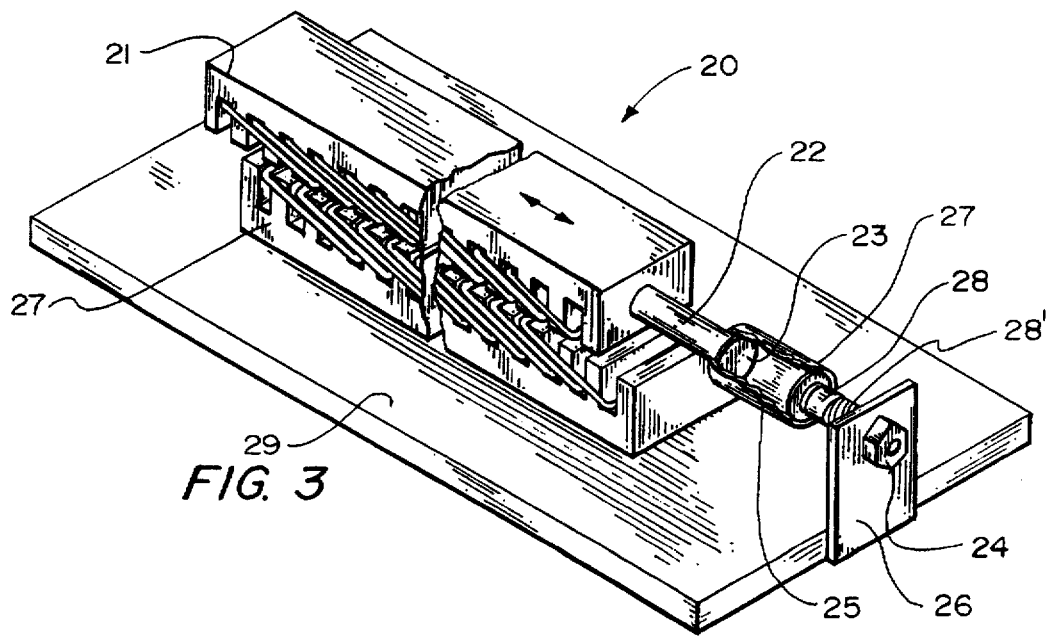
FIG. 3 is a perspective view of a linear embodiment of this invention including compression chamber resilient means.

FIG. 3 shows linear embodiment 20 of this invention, featuring bed 27—analogous to the stator of FIGS. 1, 2—affixed to base 29. Cover 21—a rotor analog—overlies and is slidable along the bed. Both cover and bed members are cut away to indicate indefinite length, and shaded notches in them contain their respective windings (shown fragmentarily). A double-headed arrow indicates limited relative translatory movement (to and fro) limited by interconnection of the cover to the bed. Piston rod 22 fixed at one end in the near end of the cover terminates in piston 23 inside pneumatic compression chamber 25 (cut away to reveal the interior) as does opposing piston 27 on piston rod 28 having end portion 28' threaded into an opening in upstanding end mount 26, where adjustably retained by end nut 28.

It will be understood that approach of the two pistons toward one another compresses the gas in the chamber, increasingly opposing the translatory movement of the cover. The dual piston arrangement is only one example of such a "gas spring" setup. A single piston may suffice, as the compression chamber itself may be affixed similarly adjustably to the end mount.

Figure 4:
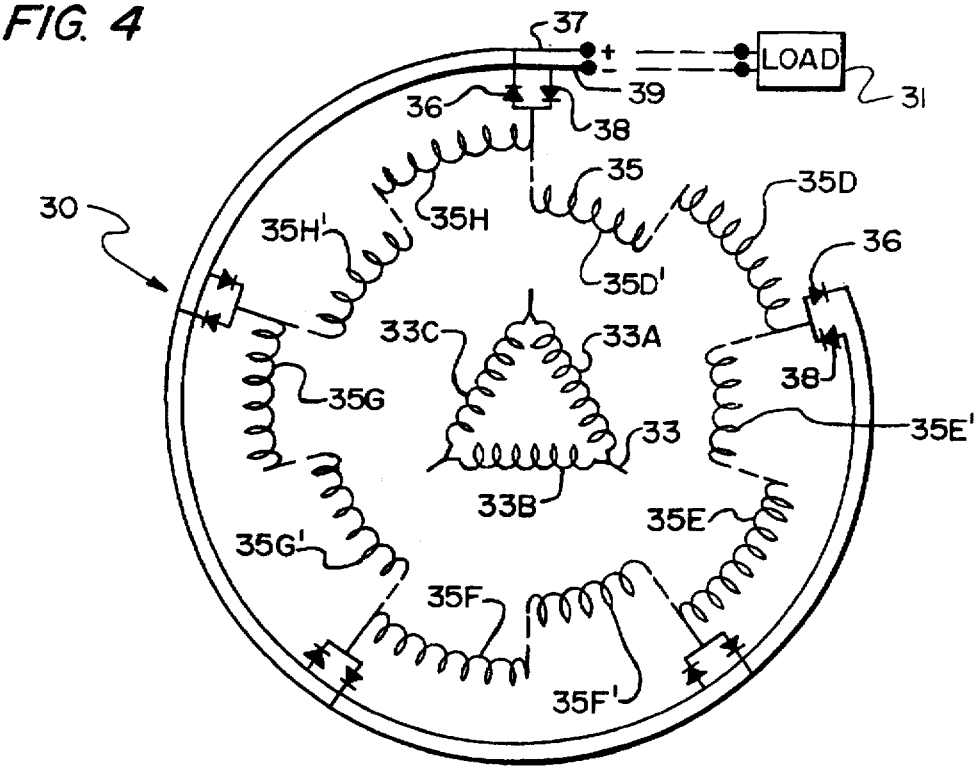
FIG. 4 is an electrical schematic of circuitry suitable in both rotary and linear embodiments of this invention.

FIG. 4 shows schematically circuit 30 useful in this invention. Although the various winding sets are coaxial in this view, suggesting a cylindrical embodiment, it will be understood that they may be rearranged flat in-line for a linear embodiment in analogous manner. Also, it should be noted that for convenience of illustration—and contrary to the actual spatial coaxial relationship shown in FIGS. 1 and 2—where the secondary windings were centered on the rotor—here in FIG. 4 the primary windings are centered because they are fewer and thus simpler to show than the more numerous secondary windings.

FIG. 4 features three-phase primary (stator) winding 33 (shown in delta form, with legs 33A, 33B, and 33C) and five-phase secondary winding 35, subdivided between the rotor and the stator in each phase portion, their junctions (dashed lines) being suitably long and flexible. Thus, the secondary winding has on the rotor legs 35D, 35E, 35F, 35G, and 35H; and has on the stator legs 35D', 35E', 35F', 35G', and 35H'. Central location of the stator windings and peripheral location of the rotor windings here is schematic only (and opposite to their respective physical locations) being selected mainly to simplify illustration of the interconnection of the larger number of windings through pairs of oppositely directed diodes 36, 38 to respective DC output lines 37, 39 (marked + and −) to LOAD 31.

The rotary and linear embodiments include corresponding leads and connections to, from, and interconnecting the various windings. As indicated—by broken lines— secondary winding interconnections are flexible and sufficiently long to accommodate movement as the rotor turns through its limited arcuate range (about a half circle). Similarly, in the linear embodiment, interconnections to the movable cover windings are conveniently in helical spring-like form so as to elongate as the cover moves through its limited straight path.

Figure 5:
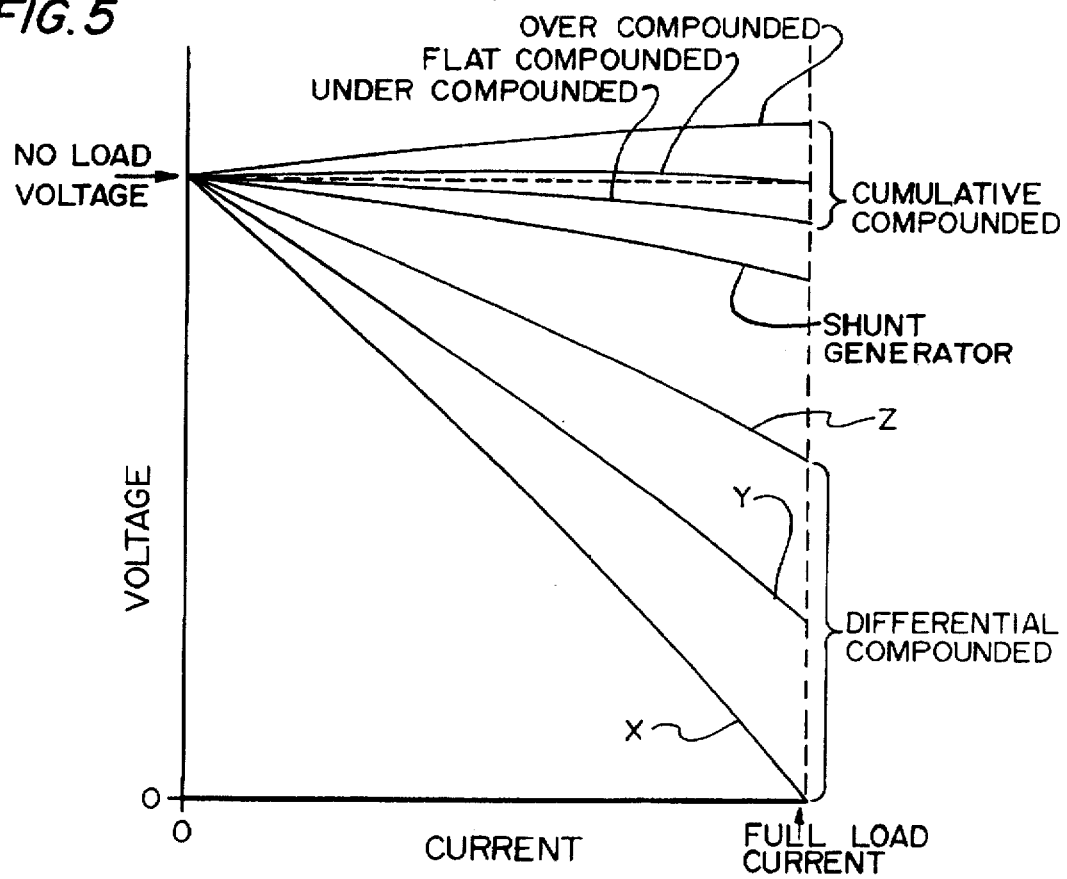
FIG. 5 is a graph of applied voltage vs. resulting load current according to this invention as compared with corresponding data for shunt motor/generator conventional winding compensation arrangement.

FIG. 5 shows graphically, with the origin (0, 0) at the lower left, the relationship of applied VOLTAGE (ordinate) to load CURRENT (abscissa) as characteristics of DC generators, with compensation of conventional type (upper part) and according to this invention (lower part). An idealized load-independent constant-voltage dashed line extends (near the top) from the NO-LOAD VOLTAGE axis to a like FULL-LOAD CURRENT axis (dashed line) at the right, for comparison.

Several CUMULATIVE COMPOUNDED curves near the top of this view also extend rightward from the NO-LOAD VOLTAGE value to the FULL-LOAD CURRENT axis, diverging a bit on the way. The OVER COMPOUNDED (topmost) curve rises slightly-left to right. The intermediate of these three curves moves gradually upward at its beginning and downward at its right end to terminate at about its starting level and hence is called FLAT COMPOUNDED. The remaining (lowest) of the three curves droops to a lower or UNDER COMPOUNDED termination.

Below the CUMULATIVE COMPOUNDED group is the unmodified curve of a SHUNT GENERATOR curve, drooping even more at FULL-LOAD CURRENT.

DIFFERENTIAL COMPOUNDED curves X, Y, Z of FIG. 4 droop more rapidly from the NO-LOAD VOLTAGE to the FULL-LOAD CURRENT axis, the lowest one (X) reaching an idealized null voltage FULL-LOAD CURRENT. The next pairs of views illustrate how allocation of secondary windings between the rotor and the stator (or respective equivalent members) can provide drastically drooping curves, such as Y and Z.

Figure 6A:
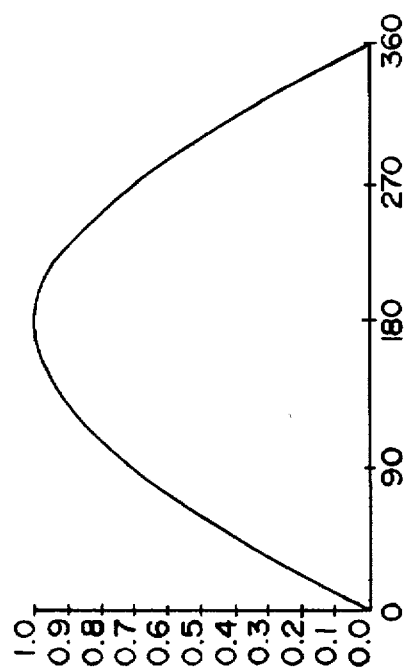
FIG. 6A is a vector diagram corresponding to a given (50/50) ratio of subdivision of output winding allocation as between stator and rotor in the cylindrical embodiment.

FIG. 6A shows a triangular vector diagram for allocation of output winding subdivided half-and-half between stator and rotor in a cylindrical embodiment of this invention. Quadrantal degree markings of rotor rotation angle proceed clockwise around a circle from the left: 0°, 90°, 180°, and 270°. Stator radial line A drawn horizontally from the 0° point rightward to the center of the circle is followed at an included angle of rotation D by rotor radial line B ending at a point on the upper right on the circle such that vector sum line C extends from the beginning of line A to the end of line C at the same point. The B-C apex or junction is movable along the circle to equate D to permitted angles of rotation, and each secondary output voltage is given by vector sum line C.

Figure 6B:
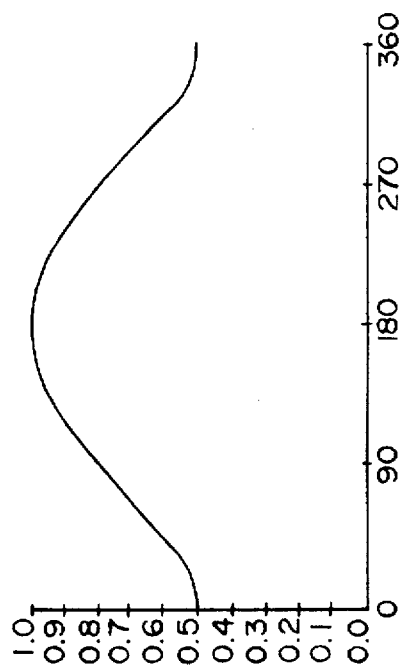
FIG. 6B is a graph of output voltage variation vs. rotor angle between FIG. 6A input winding and output winding positions for the cylindrical embodiment.

FIG. 6B shows graphically UNIT OUTPUT VOLTAGE vs. ROTOR SHAFT ANGLE IN DEGREES for the half-and-half winding allocation of FIG. 6A—the lowest (X) of the DIFFERENTIAL COMPOUNDED curves. The resulting output voltage curve is sinusoidal, proceeding to the right and upward from the origin of the two axes to unitary value (1.0) at 180° and down again to the horizontal axis at 360°. The differential compounding range is available from 0° to 180° in the first half turn, and the reverse in a second half turn, and the limit on rotor rotation is at most about a half-turn.

Figure 7A:
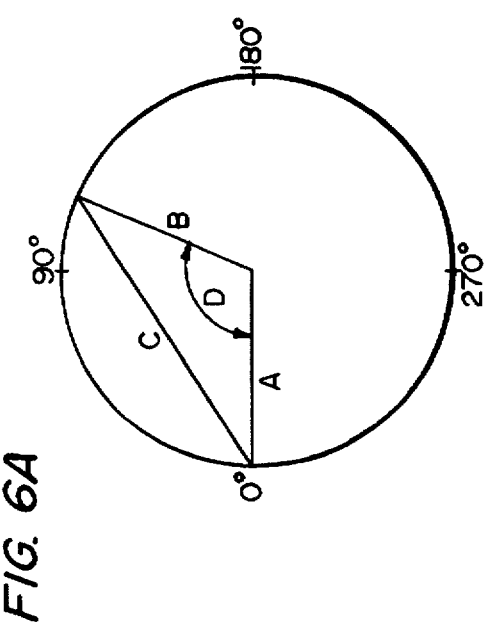
FIG. 7A is a vector diagram similar to FIG. 6A but for another given (25/75) ratio of subdivision of output winding so allocated.

FIG. 7A shows a triangular vector diagram for allocation of output winding subdivided ¼ to ¾ as between stator and rotor in a cylindrical embodiment of this invention. Quadrantal degree markings representing rotor rotation angle begin at the left and proceed. clockwise around a circle as in FIG. 6A. Radial line A' is drawn from two radius lengths outside the circle through the 0° point to the center to total three radii long. Radial line B' is drawn upward and rightward at included angle D' to end on the circle, where vector sum line C' from the beginning of line A' joins it.

Figure 7B:
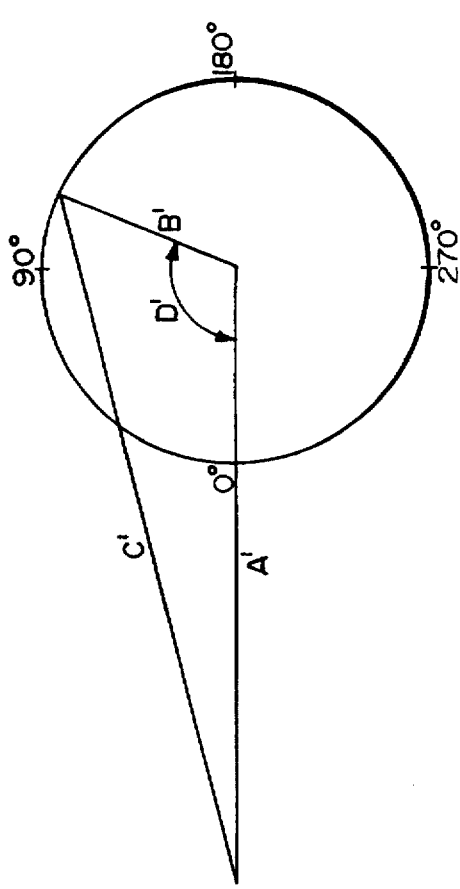
FIG. 7B is a graph of output voltage variation vs. rotor angle between the FIG. 7A input winding and output winding positions.

FIG. 7B shows graphically UNIT OUTPUT VOLTAGE vs. ROTOR SHAFT ANGLE IN DEGREES for the ¼ to ¾ winding allocation of FIG. 7A. The resulting curve begins at 0.5 on the vertical axis and proceeds rightward and gradually upward through an early inflection point and up to and over a smoothly undulating peak at 180°, 1.0 and returns symmetrically down to 360°, 0.5. This 1:3 allocation more closely approximates an ogee-like gradual take-off to a linear midpart and gradual approach to the maximum than FIG. 6B's straight-line takeoff and midpart followed by a final tail-off, although the range of adjustment is only half as much as in FIG. 6B's equal subdivision.

The shaft angle in FIGS. 6B and 7B is readily recognizable as an analog of the translatory movement of cover 21 a given distance relative to bed 27 in the flat or linear embodiment of FIG. 3. In either embodiment, calibrated markings can be added to enable visual observation of the movement of the respective members. However, automated measurement of applied voltage and load current at the end of corresponding position or change in position of the resilient means is better than attempted visual observation and attendant slower manual control, because of usual rapidity of fluctuations.

Operation of preferred embodiments of this invention is readily understood by reference to the foregoing text and diagrams and is summarized briefly here. Electrical energization of the multi-phase primary winding on the fixed member (stator or bed), as by a conventional three-phase power source, induces a moving polyphase magnetic flux in the secondary winding including whatever portion of it is on a movable member (rotor or cover). The moving flux generates a torque to produce like (rotary or translatory) movement of the latter member within its limited range of permissible movement. Here such movement is opposed by "spring torque" of the resilient means.

If the respective torques become equal (as well as opposite) within the limited range of movement of the moving member, it will come to rest intermediately. Given availability of a desired operational output setting within the range, the spring action operates to maintain equilibrium over a range of variability in the load demand for input power. Whenever a change in the load's current demand occurs the movable member will move to a new equilibrium point unless the change is so great as to drive it to either limit.

The resilient member should have a range of resilience to cope with substantially all of the entire operating range of the load. Pre-loading of the resilient member at the no-load position by the indicated adjustment means can be helpful, non-linearity tailoring of the resilience to match non-linearity in the characteristic electrical demand of the load powered according to this invention.

For arc furnaces or welders or other loads having negative voltage coefficients of resistance, rotor and stator winding portions are reverse-connected or differential-compounded, whereas for motors or other loads with positive voltage coefficients of resistance or with large transmission loss they are cumulative compounded.

The selected range of movement between the rotor and stator (or equivalent members) may be adjusted so as to work in the opposite half (or other selected portion) of the curve of output vs. movement, or even to work partly in one and partly in the other, bridging the curve peak. Thus, the modified converter of this invention can be changed in its operation from differential to cumulative (flat, over, or under) compounding without changing any electrical connections whatever. Though odd load demand characteristics can be imagined for which operation over more than half of the curve might be useful, no practical necessity for such design is foreseen.

Apparatus of this invention is essentially free from the wear and maintenance problems encountered with conventional rotary AC/DC converters, and also free of the harmonics produced by rectifier circuits and fed back upstream as electromagnetic interference into the transmission lines and over into other equipment powered therefrom. It renders obsolete the excessive leakage flux customarily built into arc transformers. Both rotary and linear embodiments can be oil-immersed for cooling and for damping of excessive fluctuations.

The foregoing advantages are attained without significant displacement of power factor, and other benefits will become apparent to those who have an opportunity to use apparatus of this invention.

Preferred embodiments and variants have been suggested for this invention. Other modifications may be made, as by adding, combining, deleting, or subdividing compositions parts, or steps, while retaining all or some of the advantages and benefits of the present invention—which itself is defined in the following claims.

I claim:

1. An electric power converter in cylindrical form, comprising
   a ferromagnetic axial rotor and a ferromagnetic coaxial stator, the rotor being rotatable relative to the stator through an angle limited to at most about a half circle of arc;
   resilient means interconnecting the stator and the rotor, and so adapted to resist rotor rotation relative to the stator;
   a multi-phase power input winding on the stator, adapted to produce a polyphase rotating magnetic field when energized; and
   a multi-phase electrical power output winding subdivided by being wound in part on the stator and in part on the rotor, and magnetically coupled to the power input winding on the rotor.

2. Electric power converter according to claim 1, wherein the resilient means includes a torsion spring attached (i) at its first end to the stator, and (ii) at its second end to the rotor, and operable so that the limited rotation of the rotor relative to the stator tightens the spring and is opposed thereby.

3. Electric power converter according to claim 1, wherein the subdivided parts of the output winding are connectable additively to sum their outputs when required to power an electrical load whose power requirement increases with increasing load current, and alternatively are connectable differentially to offset their outputs when required to power an electrical load whose power requirement decreases with increasing load current.

4. Electric power converter according to claim 1, connected to an electrical load having a variable demand for power, whereby the opposition of the resilient means and the allocation of the subdivided winding in given part to the stator and remaining part to the rotor are such that rotation of the rotor is effective to match converter output power to demand by the load for such power.

5. In combination, the electrical power converter of claim 4, with the subdivided parts of the output winding connected additively, and an electrical load powered thereby, whose power demand increases with increasing current through the load.

6. The combination according to claim 5, wherein the load comprises predominantly an electrical motor.

7. In combination, the electrical power converter of claim 4, with the subdivided parts of the output winding connected differentially, and an electrical load powered thereby whose power demand decreases with increasing current through the load.

8. The combination according to claim 7, wherein the load comprises predominantly an electrical arc.

9. The combination according to claim 8, wherein the coaxial rotor is rotable relative to the stator through an angle limited to about a half circle of arc.

10. An electric power converter in linear form, comprising
    a ferromagnetic fixed bed and a ferromagnetic adjacent cover movable through a limited distance in a given translatory direction of displacement relative to the bed;
    resilient means connected to the cover and resisting such displacement of the cover relative to the bed;
    a multi-phase power input winding on the bed, producing a polyphase translatory magnetic field when energized; and
    a multi-phase electrical power output winding subdivided by being so wound in part on the bed and in part on the cover, and magnetically coupled to the input winding on the bed.

11. Electric power converter according to claim 10, wherein the resilient means includes (i) a gas compression chamber fixed relative to the bed, and (ii) gas pressure adjusting means attached to the cover, extending to the chamber, and operable to increase the gas pressure therein whenever the cover is displaced in the given translatory direction, and effectively opposing such displacement.

12. Electric power converter according to claim 10, connected to an electrical load having a variable demand for power, including in its load operation an electrical arc.

13. Electric power converter apparatus with output connectable to an electrical load, whose required power varies with its current, so as to compensate for variation in that load current, comprising
    a stator carrying a multi-phase electrical power input winding producing a polyphase moving magnetic field when energized;
    a member capable of at most only limited movement relative to the stator and carrying the major part of a multi-phase electrical power output winding magnetically coupled to the input winding; and
    resilient means, interconnecting the stator and the member of limited movement relative thereto, limiting such movement to match the converter output to the load requirement.

14. The apparatus of claim 13, wherein a minor part of the output winding is carried on the stator and so wound thereon to add its output to the output of the major part of the output winding carried on the relatively movable member.

15. The apparatus of claim 14, in combination with a load whose power requirement increases with increasing load current.

16. The apparatus of claim 13, wherein a minor part of the output winding is carried on the stator and so wound thereon to subtract its output from the output of the major part of the output winding carried on the relatively movable member.

17. The apparatus of claim 16, in combination with a load whose power requirement decreases with increasing load current.

18. The apparatus combination of claim 17, wherein the load comprises an electric arc furnace.

19. An electric power converter
    comprising a input winding in a substantially fixed position, and an output winding, magnetically coupled to the input winding and movable in substantial part relative to the input winding;
    producing, when energized, a polyphase moving magnetic field in the input winding and thus to induce relative movement of the magnetically coupled output winding; and
    resilient means interposed between the relatively fixed input winding and the relatively movable substantial part of the output winding and thereby resisting the relative movement.

20. Electric power control apparatus responsive to fluctuation in power demand of variable electrical loads, as in electric arc furnaces, and enabled to compensate for fluctuations in electric power demand, comprising
    an electrical converter having an output winding and having also an input winding powered from an external multi-phase electrical source and producing a polyphase moving magnetic field when the input winding is so powered;
    the output winding being subdivided into parts, including a part fixed relative to the input winding and a part movable relative to the input winding and relative to the fixed part of the output winding;

means magnetically coupling the moving magnetic field in the input winding to the output winding and thereby forcing the movable part of the output winding to move through a limited range relative to the input winding and relative to the fixed part of the output winding;

electrically conductive means interconnecting the output winding to an electrical load having a variable demand for electrical power when the converter is so powered; and resilient means interconnecting the fixed part and the movable part of the output winding non-electrically, opposing their relative movement.

21. Electric power control apparatus according to claim 20, including a stop limiting the range of movement of the movable part of the output winding relative to the input winding and relative to the fixed part of the output winding.

* * * * *